(12) United States Patent
Reichenbach et al.

(10) Patent No.: US 9,120,180 B2
(45) Date of Patent: Sep. 1, 2015

(54) INTERACTIVE CONTROL SYSTEM, METHODS OF MAKING THE SAME, AND DEVICES INCORPORATING THE SAME

(71) Applicant: ELECTRO SCIENTIFIC INDUSTRIES, INC., Portland, OR (US)

(72) Inventors: Robert Reichenbach, Portland, OR (US); Mehmet Alpay, Portland, OR (US); Michael Darwin, Portland, OR (US); Jeffrey Howerton, Porltand, OR (US)

(73) Assignee: ELECTRO SCIENTIFIC INDUSTRIES, INC, Portland, OR (US)

( * ) Notice: Subject to any disclaimer, the term of this patent is extended or adjusted under 35 U.S.C. 154(b) by 128 days.

(21) Appl. No.: 13/938,072

(22) Filed: Jul. 9, 2013

(65) Prior Publication Data

US 2014/0016103 A1  Jan. 16, 2014

Related U.S. Application Data

(60) Provisional application No. 61/670,883, filed on Jul. 12, 2012.

(51) Int. Cl.
*G03B 21/14* (2006.01)
*B23K 26/40* (2014.01)
(Continued)

(52) U.S. Cl.
CPC .......... *B23K 26/4075* (2013.01); *G01J 1/0411* (2013.01); *G01J 1/0437* (2013.01); *G02B 27/00* (2013.01); *G02B 27/0093* (2013.01); *G02B 27/46* (2013.01); *G06F 1/169* (2013.01); *G06F 1/1684* (2013.01); *G06F 1/1686* (2013.01); *G06F 3/0304* (2013.01); *G06F 3/0425* (2013.01); *G06F 3/04847* (2013.01); *B23K 26/38* (2013.01); *G06F 2203/0339* (2013.01)

(58) Field of Classification Search
CPC ........... B23K 26/4065; B23K 26/4075; B23K 26/408; B23K 26/4085; B23K 26/4095; B23K 26/422
USPC .......... 353/38, 62, 79, 119, 122; 345/156–173
See application file for complete search history.

(56) References Cited

U.S. PATENT DOCUMENTS 6,172,330 B1 *  1/2001  Yamamoto et al. ........ 219/121.7
7,004,590 B2 *  2/2006  Kitabayashi .................. 353/121
(Continued)

FOREIGN PATENT DOCUMENTS

KR        10-894544 B1     4/2009
KR   10-2010-0097400 A    9/2010
(Continued)

OTHER PUBLICATIONS

International Search Report of PCT/US2013/049790, 2 pages.
(Continued)

*Primary Examiner* — Sultan Chowdhury (57) ABSTRACT

Numerous embodiments of interactive control systems, methods of making the same, and devices incorporating the same are disclosed. In one embodiment, a system includes a light-resistant material; light-transmissive holes penetrating in a light-transmissive pattern through the light resistant material; and a lens disposed adjacent to the light-transmissive pattern.

22 Claims, 4 Drawing Sheets

(51) Int. Cl.
*G02B 27/00* (2006.01)
*G01J 1/04* (2006.01)
*G06F 1/16* (2006.01)
*G06F 3/03* (2006.01)
*G06F 3/042* (2006.01)
*G06F 3/0484* (2013.01)
*G02B 27/46* (2006.01)
*B23K 26/38* (2014.01)

(56) References Cited

U.S. PATENT DOCUMENTS

| | | | |
|---|---|---|---|
| 7,525,538 B2 | 4/2009 | Bathiche | |
| 7,663,612 B2 | 2/2010 | Bladt | |
| 7,778,015 B2 | 8/2010 | Weber et al. | |
| 7,880,131 B2 | 2/2011 | Andre et al. | |
| 7,884,315 B2 | 2/2011 | Andre et al. | |
| 7,960,684 B2 | 6/2011 | Payne | |
| 7,968,820 B2 | 6/2011 | Hardy et al. | |
| 8,081,430 B2 | 12/2011 | Weber et al. | |
| 8,117,744 B2 | 2/2012 | Nashner et al. | |
| 8,749,532 B2 * | 6/2014 | Li et al. | 345/179 |
| 2002/0171633 A1 * | 11/2002 | Brinjes | 345/168 |
| 2003/0193479 A1 | 10/2003 | DuFaux | |
| 2005/0047736 A1 | 3/2005 | Veligdan et al. | |
| 2008/0024470 A1 * | 1/2008 | Andre et al. | 345/204 |
| 2009/0257241 A1 | 10/2009 | Meinke et al. | |
| 2009/0273762 A1 * | 11/2009 | Ohira | 353/62 |

FOREIGN PATENT DOCUMENTS

| | | |
|---|---|---|
| KR | 10-2010-0130704 A | 12/2010 |
| WO | WO 2004/077388 A1 | 9/2004 |
| WO | WO 2006/027629 A2 | 3/2006 |

OTHER PUBLICATIONS

Written Opinion of PCT/US2013/049790, 4 pages.

* cited by examiner

INTERACTIVE CONTROL SYSTEM, METHODS OF MAKING THE SAME, AND DEVICES INCORPORATING THE SAME

CROSS REFERENCE TO RELATED APPLICATIONS

This application claims the benefit of U.S. Provisional Application No. 61/670,883, filed Jul. 12, 2012, which is herein incorporated by reference in its entirety for all purposes.

TECHNICAL FIELD

Embodiments of the present invention relate generally to interactive control systems.

BACKGROUND

In the world of consumer devices, and particularly consumer electronics, there is an ever-present demand for improved appearance, improved functionality and improved aesthetics. Industrial design has become a highly skilled profession that focuses on fulfilling this need for enhanced consumer product appearance, functionality, and aesthetics.

One area that continually receives great attention for improvement is that of user interfaces, which generally govern how a user interacts with a device to, for example, initiate, adjust or otherwise control a function supported by the device. Various types of user interfaces include touchscreens (e.g., with image-based interface features visually presented to the user by a display such a liquid crystal display), voice-based interfaces, and tangible interfaces (e.g., with interface features such as buttons, knobs, sliders, switches, keyboards, etc.), gesture interfaces (e.g., with interface features such as a computer mouse or stylus), etc. Many consumer electronics devices such as "smart phones" incorporate touchscreens that obviate the need for are designed to be portable and easy to use, and as such they often do not include keyboards to minimize device size. However as consumer products continually become smaller yet capable of supporting more functions, it becomes increasingly difficult to provide a user interface that not only allows a user to interact with the device intuitively and easily, but that is also uncluttered in form and appearance and that does not undesirably damage the aesthetic appeal of the device.

Much of the aesthetic appeal of a consumer electronic device can quickly be compromised if there are too many tangible interface features, if too much of a display area is occupied by image-based interface features, or if certain interface features are not accessible without navigating through a series of instructions or screens. Tangible interface features typically remain visible to the user at all times, regardless of how often or how little they are used. This is not only displeasing from an aesthetic standpoint, but it can be an annoying distraction that interferes with handling and manipulation of the device. Over time, some tangible interface features can undesirably break, crack, get jammed, or even fall off of the device. Lastly, tangible interface features sometimes are not perfectly mated with the body of the device. Such an imperfect mating can enable liquids, dirt, and other debris to undesirably enter into the body of the device to potentially damage the device or at least degrade the aesthetic appearance of the device.

SUMMARY

One embodiment of the present invention can be exemplarily characterized as a system that includes a light-resistant material; light-transmissive holes penetrating in a light-transmissive pattern through the light resistant material; and a lens disposed adjacent to the light-transmissive pattern.

Another embodiment of the present invention can be exemplarily characterized as a system that includes a light-resistant material; light-transmissive holes penetrating in a light-transmissive pattern through the light resistant material; a projection system operative to project light through at least one of the light-transmissive holes; and a light-modification system configured to modify the projected light to form an image on a target surface remotely located from the pattern to form an image on the target surface.

Yet another embodiment of the present invention can be exemplarily characterized as a system that includes a light-resistant material; light-transmissive holes penetrating in a light-transmissive pattern through the light resistant material; a sensing system having a field of view and operative to detect light transmitted through at least one of the light-transmissive holes from an image reflected by a surface; and a controller coupled to the sensing system, the controller configured to determine a position of an object disposed within the field of view relative to the image.

DETAILED DESCRIPTION OF THE ILLUSTRATED EMBODIMENTS

The following embodiments are described in sufficient detail to enable those skilled in the art to make and use the invention. It is to be understood that other embodiments would be evident based on the present disclosure, and that process or mechanical changes may be made without departing from the scope of the present invention defined in the claims.

In the following description, numerous specific details are given to provide a thorough understanding of the invention. However, it will be apparent that the invention may be practiced without these specific details. In order to avoid obscuring the present invention, some well-known system configurations and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGS. Similarly, although the views in the drawings for ease of description generally show similar orientations, this depiction in the FIGS. is arbitrary for the most part. Generally, the invention can be operated in any orientation. In addition, where multiple embodiments are disclosed and described having some features in common, for clarity and ease of illustration, description, and comprehension thereof, similar and like features one to another will ordinarily be described with like reference numerals.

Figure 1:
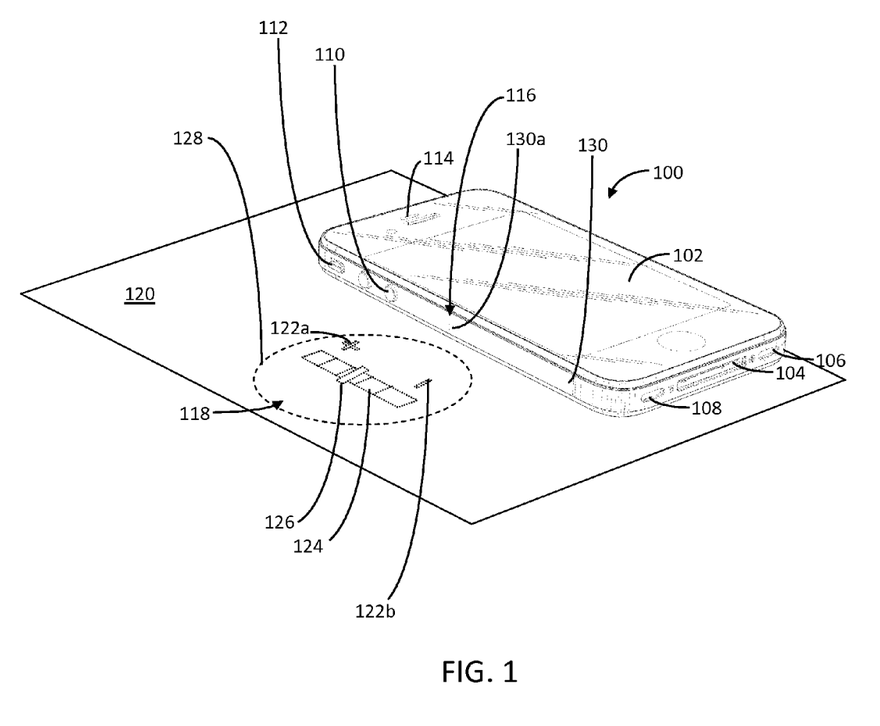
FIG. 1 is a perspective view schematically illustrating an exemplary device incorporating an interactive control system and an interactive control system implemented by the remote control system, according to one embodiment.

FIG. 1 is a perspective view schematically illustrating an exemplary device incorporating an interactive control system and an interactive control system implemented by the interactive control system, according to one embodiment.

Referring to FIG. 1, a device such as device 100 (e.g., a "smart phone", capable of functioning as a portable media player, digital camera, video camera, navigation device, web browser, phone, mobile computer, etc.), also referred to herein as an "device", is shown. Although not shown, the device may include conventional components such as a power supply, a microprocessor ("CPU"), a computer memory, an accelerometer, an antenna, etc. As illustrated, device 100 may, for example, include a display 102 (e.g., with a touch-sensitive screen), a power/data transfer port 104, a speaker 106 and a microphone 108. The display 102 may present to the user image-based interface features such as buttons, a key pad, and the like. Accordingly when the display 102 of the touch-sensitive type the image-based interface features can be engaged (e.g., touched) by a user to initiate one or more functions supported by the device 100. The device 100 may also include physical interface features such as a volume-control button 110, a vibrate on/off toggle button 112, and the like. Again, these physical interface features can be engaged (e.g., pressed, slid, etc.) by the user to initiate one or more functions supported by the device 100 (e.g., decrease volume sound generated by speaker 106). The device 100 may also include a proximity-based interface feature 114 which can deactivate the display 102 when, in some applications, the device 100 is brought sufficiently close to the user's body (e.g., within about 1 inch).

The device 100 may also include an interactive control system 116 configured to project an image-based interface feature 118 (also referred to herein simply as "image 118") onto a target surface (e.g., target surface 120). The image 118 will typically be projected a sufficient distance from the device 100 such that it can be easily interacted with by a user. In some embodiments, the distance to which image 118 is projected corresponds to the power of a light source incorporated within the interactive control system 116, the types of lenses used, etc. In one embodiment, the image 118 can be projected a distance in a range between 1 inch and about 5 feet away from the device 100. In another embodiment, the image 118 can be projected a distance in a range between 6 inches and about 1 foot away from the device 100. Generally, the image 118 projected onto the target surface 120 corresponds to some function supported by the device 100. For example, the image 118 may correspond to a brightness-adjustment function capable of adjusting the brightness of the display 102; and may include relative-value indicia 122a and 122b (e.g., to indicate "high" and "low" brightness, respectively), a scale indicia 124 (e.g., to indicate possible brightness levels between "high" and "low" brightness), and a present-value indicia 126 (to indicate the current brightness level of the display 102). It will be appreciated, however, that the image 118 may be desirably or beneficially configured in any manner and may desirably or beneficially correspond to any function supported by the device 100. For example, the image 118 may visually represent a keyboard, a switch, a control toggle, an area within which an object may be used as a mouse, or the like or a combination thereof.

In one embodiment, the image 118 is projected within a remote sensing region 128 (also referred to herein as a "field of view") of the interactive control system 116. Generally, the size and shape of the remote sensing region 128 corresponds to the size and shape of the image 118. As will be described in greater detail below, the interactive control system 116 can be configured to determine the position of an object (e.g., a user's fingertip, a stylus, etc.) relative to the image 118 within the remote sensing region 128. In this embodiment, operation of the device 100 can initiated, adjusted or otherwise controlled based on the determined position. Thus in the illustrated example, a user may, for example, place their fingertip at or near a portion of the target surface 120 within the remote sensing region 128 and adjacent to the present-value indicia 126 and then move their finger along the scale indicia 124 (e.g., toward the relative-value indicia 122b) for a desired distance. At this time, the position of the user's finger can be determined by the interactive control system 116. The determined position of the user's finger can then be used to control an operation of the device 100 (e.g., to increase the brightness of the display 102 by an amount corresponding to the position of the user's finger relative to the scale indicia 124). It will be appreciated, however, that any function supported by the device 100 can be desirably or beneficially initiated, adjusted or otherwise controlled by determining the position of an object within the remote sensing region 128 relative to the image 118.

Although the example embodiment illustrated in FIG. 1 has described the device 100 as a "smart phone," it will be appreciated that the device 100 can be any device having an exterior surface and supporting any function that may be initiated, operated, controlled or otherwise used by a user. Thus the interactive control system 116 may be, incorporated into or implemented or used with devices such as personal computers, laptop computers, tablet computers, personal digital assistants, portable media players, televisions, computer monitors, telephones, mobile phones, thermostats, electronic books, door access security systems, doorbells, watches and the like. As illustrated in FIG. 1, and as will be discussed in greater detail below, the interactive control system 116 is physically integrated with the body of the device 100. It will be appreciated, however, that the interactive control system 116 may provided as a physically separate component from the body of the device 100, but that can be communicatively coupled to the device 100 by wired (e.g., USB cable) or wireless (e.g., WiFi) means.

In one embodiment, the interactive control system 116 can be actuated to project the image 118 and determine the position of an object relative to the projected image 118 in any desired manner. For example, the interactive control system 116 can be actuated when an object (e.g., a user's finger, a stylus, etc.) is brought sufficiently close to an active region (e.g., active region 130a) of the exterior surface 130 in a similar manner as with the proximity-based interface feature 114.

Figure 2:
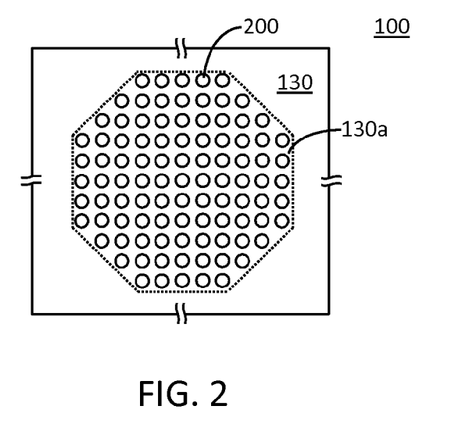
FIG. 2 is a plan view schematically illustrating an active region of the exterior surface shown in FIG. 1, in accordance with one embodiment.
Figure 3:
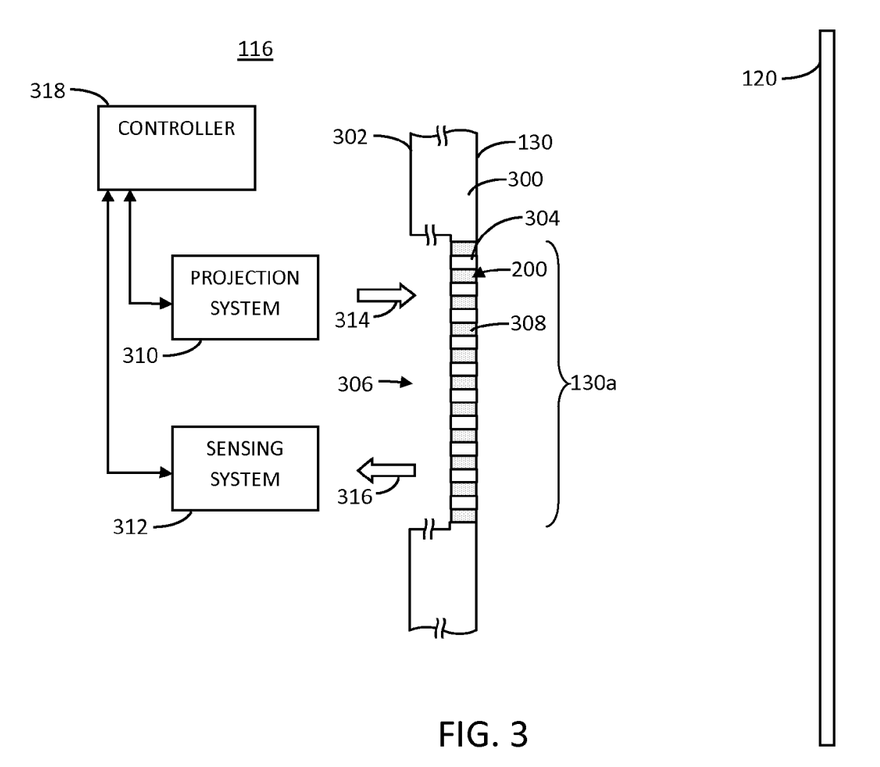
FIG. 3 is a partial cross-section view illustrating the active region of the exterior surface shown in FIG. 2, together with other components of the interactive control system according to some embodiments.

FIG. 2 is a schematic view illustrating the active region 130a of the exterior surface 130 shown in FIG. 1, in accordance with one embodiment. FIG. 3 is a partial cross-section view illustrating the active region 130a of the exterior surface 130 shown in FIG. 2, together with other components of the interactive control system 116, according to some embodiments.

Referring to FIG. 2, the active region 130a can generally be identified as a region of the exterior surface 130 that extends between light-transmissive holes 200 formed in the exterior surface 130 (e.g., the region of the exterior surface 130 enclosed by the illustrated dotted line). Although the light-transmissive holes 200 are illustrated as being arranged in a light-transmissive pattern that generally defines an octagon, it will be appreciated that the light-transmissive holes 200 may be arranged in any desired or beneficial manner.

The light-transmissive holes 200 shown in the FIGS. are invisible in the sense that each of the light-transmissive holes 200 cannot be seen by the unaided human eye. For example, the limit of resolution for the human eye is about 0.1 mm at a distance from the eye of 1 meter. In children, the resolution might be somewhat finer, for example, 0.04 mm. Thus, depending upon the anticipated viewer and viewing distance, the size of the light-transmissive holes 200 will be selected to be below the limit of resolution, and it will accordingly be understood that the term "invisible hole" refers to this upper limit. Thus, as defined herein, "invisible holes" refers to light-transmissive holes 200 that are smaller than resolvable by an unaided human eye. It will be appreciated, however, that in other embodiments, at least some of the light-transmissive holes 200 (or all of the light-transmissive holes 200) can be configured so as to be substantially "visible." In one embodiment, the light-transmissive holes 200 have a diameter at the exterior surface 130 of about 30 μm. Center-to-center spacing, or pitch, between the light-transmissive holes 200 can nominally be about 200 μm. However, the size of the active region 130a itself can vary from a fraction of 1 mm to several mm across as desired or as beneficial.

Referring to FIG. 3, the exterior surface 130 is defined by a body 300 having a back surface 302 that is opposite to the exterior surface 130. The body 300 can be formed of any suitable material (e.g., metal, ceramic, glass, plastic, or the like or a combination thereof). In some embodiments, the body 300 is formed of a light-resistant material. In one embodiment, the body 300 is formed of aluminum, an aluminum alloy, stainless steel, glass coated with a light-resistant material (e.g., paint, film, etc.), colored plastic, or the like or a combination thereof. As used herein, a "light-resistant" material refers to a substantially opaque material, a light-absorbing but translucent material, a reflective material or any other material having some degree of light attenuation, up to and including complete opacity. A portion of the body 300 is thinned to form a thinned body region 304 and a recess 306 and the light-transmissive holes 200 extend through the thinned body region 304. In one embodiment, the thinned body region 304 is of a sufficient thickness (e.g., at least about 400 μm to about 500 μm) to enable the thinned body region 304, where it exists, to be light-resistant. The light-transmissive holes 200 may optionally be filled (e.g., partially or completely) with a light-transmissive material 308 to prevent dust, water, or other undesirable debris from entering into the light-transmissive holes 200. The body 300 can be thinned, and the light-transmissive holes 200 can be formed in any desirable manner. For example, the body 300 can be thinned, the light-transmissive holes 200 can be formed, and the light-transmissive material 308 can be provided, as exemplarily described in any of U.S. Pat. Nos. 7,968,820, 7,880,131 and 7,884,315, all of which are incorporated herein by reference.

Generally, the light-transmissive holes 200 can be structured and oriented within the body 300 to allow the interactive control system 116 to adequately project an image 118 onto the target surface 120 and determine the position of an object relative to the projected image 118 within the remote sensing region 128. Thus the structure and orientation of light-transmissive holes 200 within the body 300 can correspond to the anticipated orientation of the target surface 120 relative to the active region 130a of the exterior surface 130. For example when, as illustrated in FIG. 3, the target surface 120 is anticipated to be oriented substantially parallel to the active region 130a, the light-transmissive holes 200 can be oriented such that their axes are substantially orthogonal to the active region 130a of the exterior surface 130.

As shown in FIG. 3, the interactive control system 116 includes a projection system 310 and a sensing system 312, both of which are disposed within the device 100. As schematically illustrated by arrow 314, the projection system 310 is configured to project light along an optical path through at least one of (or at least substantially all of) the light-transmissive holes 200 to project an image 118 onto the target surface 120. Similarly, as schematically illustrated by arrow 316, the sensing system 312 is configured to detect light transmitted along an optical path through at least one of (or at least substantially all of) the light-transmissive holes 200 from the image 118 (or a portion thereof) reflected by the target surface 120.

Generally, the projection system 310 includes a light source (not shown) configured to generate light. Light generated by the projection system 310 can be polarized, unpolarized or a combination thereof. In one embodiment, light emitted by the projection system 310 is visible light (e.g., having a wavelength in a range from about 380 nm to about 740 nm), infrared light (e.g., near infrared light having a wavelength in a range from about 740 nm to about 1.4 μm, short-wavelength infrared light having a wavelength in a range from about 1.4 μm to about 3 μm, mid-wavelength infrared light having a wavelength in a range from about 3 μm to about 8 μm, long-wavelength infrared light having a wavelength in a range from about 8 μm to about 15 μm), or the like or a combination thereof.

In one embodiment, the projection system 310 may project light having a single wavelength (or a single, relatively narrow, range of wavelengths) to form an image 118 that is visible to the unaided human eye and the sensing system 312 can be sensitive to the visible light. In another embodiment, however, the projection system 310 can project light having multiple distinct wavelengths (or a single relatively wide range of wavelengths, or multiple discreet ranges of wavelengths) to form an image 118 that has a visible component and an invisible component (i.e., a component that is not visible to the unaided human eye). In such an embodiment, the sensing system 312 can be sensitive to the invisible component of the image 118. Further, the projection system 310 may project coherent light, incoherent light, or a combination thereof. In yet another embodiment, the projection system 310 can project coherent and incoherent light to form the image 118 and the sensing system 312 can be sensitive to the coherent light. In this embodiment, the coherent light can be visible or invisible to the unaided human eye.

The light source may include one or more incandescent lamps, one or more arc lamps, one or more fluorescent lamps, one or more gas-discharge lamps, one or more semiconductor light-emitting diodes (LEDs), one or more organic LEDs (OLEDs), one or more quantum dot LEDs (QD-LEDs), one or more laser diodes (e.g., a quantum well laser diode, a quantum cascade laser diode, a separate confinement heterostructure laser diode, a distributed feedback laser diode, a vertical-cavity surface emitting laser diode, a vertical-external-cavity surface emitting laser diode, an external-cavity laser diode, etc.), or the like or a combination thereof. In one embodiment, the light source may be provided as an emissive display capable of displaying images (e.g., a LED array, an OLED array, a vertical-external-cavity surface emitting laser (VCSEL) array, etc.). In one embodiment, the projection system 310 may optionally include a light-modification system (not shown) configured to at least partially block, reflect, scatter, or the like, a portion of the light generated by the light source to form the image 118. The light-modification system may include an aperture plate, mechanical iris, liquid crystal display (LCD) panel, mirror, mirror array, micro-electro-mechanical system (MEMS) device, grating, or the like or a combination thereof.

Generally, the sensing system 312 includes a photodetector (not shown) that is sensitive to at least a portion of at least some of the light transmitted through the light-transmissive holes 200 from the target surface 120. Accordingly, the photodetector can detect at least a portion of at least some of the light transmitted through the light-transmissive holes 200. The photodetector can be provided as one or more active pixel sensors (APs), one or more charge-coupled devices (CCDs), one or more cryogenic detectors, one or more photodiodes, one or more photoresistors, one or more photovoltaic cells, one or more photocathodes, one or more phototransistors, one or more quantum dot photoconductors, one or more bolometers, one or more photomultiplier tubes, or the like or a combination thereof. It will be appreciated that the spatial and spectral resolution of the sensing system 312 can be selected or obtained as desired or beneficial.

Suppression or elimination of background noise (e.g., due to light reflections off a back side of the thinned body region 304, due to extraneous light between the body 300 and the target surface 130, etc.) may be accomplished where desired or beneficial. For example, background noise can be suppressed, reduced, or eliminated via numerous differential techniques including DC nulling, implementing a differential sensor array comparator (with comparison being accomplished mathematically, with analogue circuit, etc.), optical interference arrangements, or the like or a combination thereof.

The interactive control system 116 may also include a controller 318 coupled to the projection system 310, the sensing system 312, or both. In one embodiment, the controller 318 may be configured to control an operation of the projection system 310. For example, the controller 318 can be configured to cause the projection system 310 to project an image 118 corresponding to a function supported by the device 100. In another example, the controller 318 can be configured to modify the image 118 projected by the projection system 310 (e.g., by controlling an operation of the light-modification system) to correspond to, for example, the user's interaction of an object (e.g., the user's finger, a stylus, etc.) with the projected image 118. In another embodiment, the controller 318 may be configured to determine a position of an object disposed within the remote sensing region 128 relative to the image 118. In another embodiment, the controller 318 may be configured to control an operation of the device 100 based on the determined position.

The controller 318 may be an electronic circuit comprising one or more components, including digital circuitry, analog circuitry, or both. The controller 318 may be a software and/or firmware programmable type; a hardwired, dedicated state machine; or a combination thereof. In one embodiment, the controller 318 is of a programmable microcontroller solid-state integrated circuit type that includes a memory and one or more central processing units. Memory associated with the controller 318 (if present) may be comprised of one or more components and may be of any volatile or nonvolatile type, including the solid-state variety, the optical media variety, the magnetic variety, a combination of these, or such different arrangement as would occur to those skilled in the art. The controller 318 may further include operating logic in the form of software instructions, hardware instructions, dedicated hardware, or the like that defines one or more control processes or the like as exemplarily described herein. In one embodiment the controller 318 can optionally be provided as, or embodied within, the microprocessor of the device 100.

Figure 4:
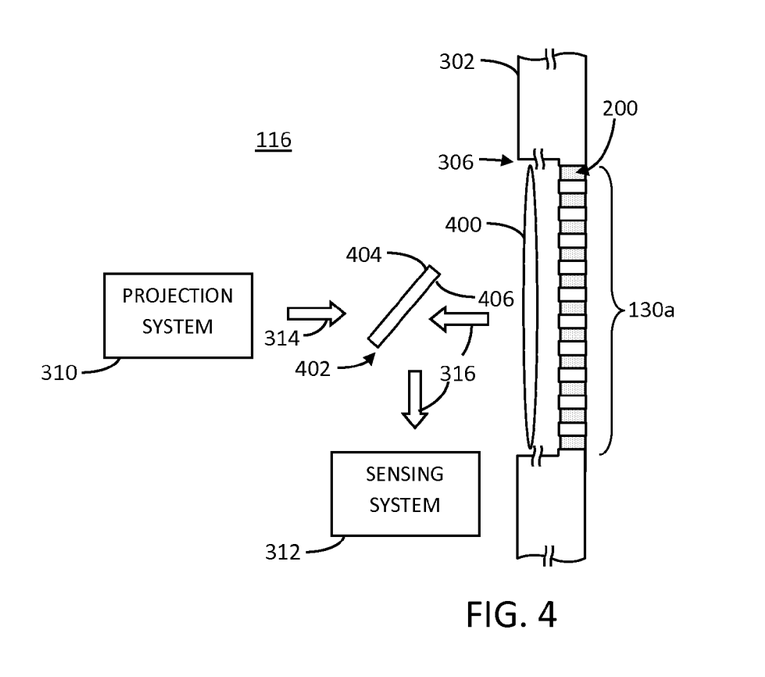
FIGS. 4 to 6 are schematic views illustrating some embodiments of the interactive control system shown in FIG. 3.
Figure 5:
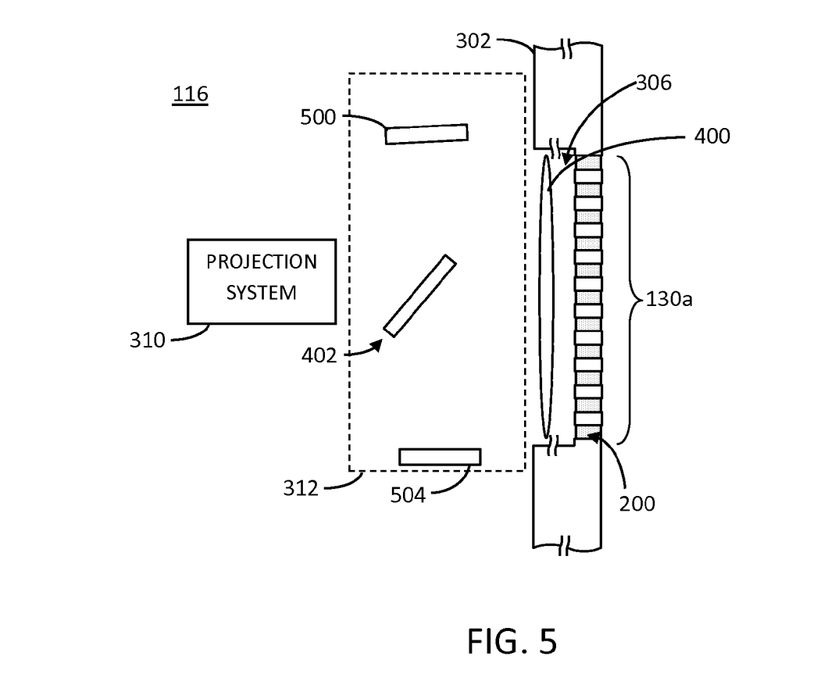
Figure 6:
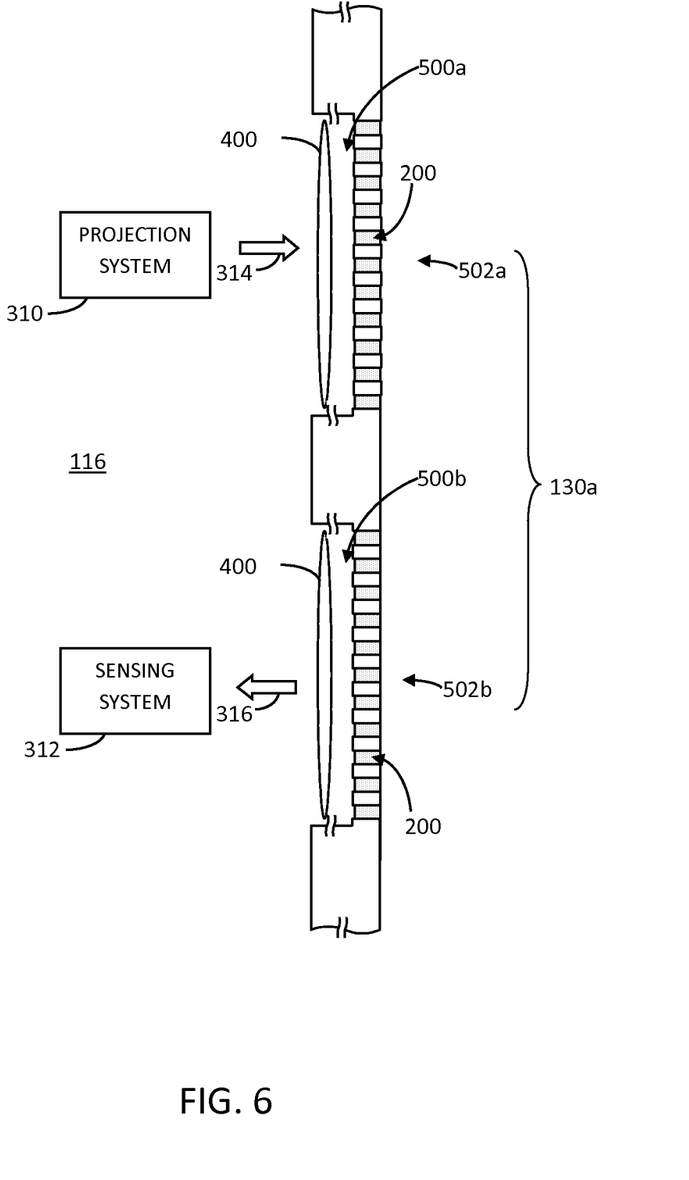

FIGS. 4 to 6 are schematic views illustrating some embodiments of the interactive control system shown in FIG. 3.

Referring now to the embodiment exemplarily illustrated in FIG. 4, the interactive control system 116 may include a projection system 310 and a sensing system 312 as exemplarily described above, and may further include a lens 400 adjacent to the light-transmissive pattern (e.g., within the recess 306). Although the lens 400 is illustrated as a single component, the lens 400 may include any number of components configured to increase, decrease or hold constant the size of image 118 on the target surface 120. Although the lens 400 is illustrated as being oriented such that the optical axis of the lens is substantially parallel to the axis of at least one of the light-transmissive holes 200, it will be appreciated that the lens 400 may be mounted or oriented within the recess 306 in any manner desired or beneficial.

In the illustrated embodiment, the interactive control system 116 may include a beam splitter 402 disposed with the optical paths of the projection and sensing systems 310 and 312, respectively. The beam splitter 402 is provided as what is known as a "half-silvered mirror" having a first surface 404 and a second surface 406 opposite the first surface. In other embodiments, however, the beam splitter 402 can be provided as any desired or beneficial type of beam splitter (e.g., a polarizing beam splitter, prismatic beam splitter, a dichroic mirrored prism, etc.).

The projection system 310 and beam splitter 402 are configured so as to allow light to be projected from the projection system 310 through the beam splitter 402 (e.g., sequentially through the first and second surfaces 404 and 406) and then to one or more of the light-transmissive holes 200 (e.g., as indicated by arrow 314). The sensing system 312 and beam splitter 402 are configured so as to allow light transmitted through one or more of the light-transmissive holes 200 to be reflected by the beam splitter 402 (e.g., at the second surface 406) to be incident upon the sensing system 312 (e.g., as indicated by arrows 316).

Referring to the embodiment exemplarily illustrated in FIG. 5, the interactive control system 116 may include a projection system 310, and a lens 404, and a beam splitter 402 as exemplarily described above. In the illustrated embodiment, however, the sensing system 312 may be provided as a Michelson interferometer including, for example, a mirror 500 forming the reference leg and a photodetector 504 forming the sensing leg. It will be appreciated that the sensing system 312 may be provided as any desired or beneficial optical interferometric system (e.g., a Twyman-Green interferometer, Mach-Zehnder interferometer, a Mirau interferometer, etc.).

In the embodiments shown in FIGS. 4 and 5, light projected by the projection system 310 and detected by the sensing system 312 is transmitted through the same light-transmissive holes 200 or the through the same pattern of light-transmissive holes 200. In another embodiment, however, the light-transmissive hole(s) 200 through which light can be projected can be different from the light-transmissive hole(s) 200 through which light is detected. For example, with reference to FIG. 6, the interactive control system 116 may include a projection system 310 and a sensing system 312 as exemplarily described above, and may further include a lens 400 disposed within a first recess 500a (similar to recess 306) and another lens 400 disposed within a second recess 500b (similar to recess 306). The projection system 310 may be configured to project light transmitted (e.g., as indicated by arrow 314) through the lens 400 and through one or more light-transmissive holes in a first light-transmissive pattern 502a of light-transmissive holes. The sensing system 312 may be configured to detect light transmitted (e.g., as indicated by arrow 316) transmitted through the lens 400 and through one or more light-transmissive holes in a second light-transmissive pattern 502b of light-transmissive holes.

In the embodiments exemplarily described above with respect to FIGS. 4 to 6, although the interactive control systems 116 have been described as including one or more lenses 400, it will be appreciated that the lens 400 may be omitted, provided that the projection and sensing systems 310 and 312 can adequately project an image 118 and detect light without a lens 400.

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. The invention is defined by the following claims, with equivalents of the claims to be included therein.

What is claimed is:

1. A system comprising:
   a light-resistant material;
   light-transmissive holes penetrating in a light-transmissive pattern through the light resistant material;
   a lens disposed adjacent to the light-transmissive pattern; and
   a sensing system configured to detect light transmitted along an optical path extending through the lens and at least one of the light-transmissive holes.

2. The system of claim 1, wherein the light-resistant material comprises at least one selected from the group consisting of a metal, a ceramic, and a polymer.

3. The system of claim 1, wherein at least some of the light-transmissive holes are substantially invisible.

4. The system of claim 3, wherein all of the light-transmissive holes are substantially invisible.

5. The system of claim 1, wherein the lens is disposed along the optical path between the light-transmissive pattern and the sensing system.

6. The system of claim 1, wherein the sensing system is configured to detect the light reflected from a surface remotely located from the pattern.

7. The system of claim 6, wherein the system further comprises a controller coupled to the sensing system, wherein the controller is configured to control an operation of the device based on the detected light.

8. A system, comprising:
   a light-resistant material;
   light-transmissive holes penetrating in a light-transmissive pattern through the light resistant material;
   a lens arranged adjacent to the light-transmissive pattern such that light transmitted through the lens is transmittable through the light-transmissive holes; and
   a projection system operative to project an image through the lens, the projection system including:
   a light source configured to generate light; and
   a light-modification system configured to modify the generated light.

9. The system of claim 8, wherein the light-resistant material at least partially defines an exterior surface of a device configured to perform at least one function.

10. The system of claim 9, wherein the system further comprises a controller coupled to the projection system, wherein the controller is configured to control an operation of the projection system based on the at least one function supported by the device.

11. The system of claim 8, wherein the projection system is operative to project the image onto a target surface located at a distance in a range between one inch and five feet away from the pattern.

12. The system of claim 11, wherein the projection system is operative to project the image onto a target surface located at a distance in a range between six inches and one foot away from the pattern.

13. The system of claim 9, further comprising the device, wherein the device is at least one selected from the group consisting of a smartphone, laptop computer, a watch and a thermostat.

14. The system of claim 8, wherein the system further comprises a controller coupled to the projection system, wherein the controller is configured to modify the image projected by the projection system.

15. The system of claim 14, wherein the controller is configured to control an operation of the light-modification system to modify the image projected by the projection system.

16. A system, comprising:
   a light-resistant material;
   light-transmissive holes penetrating in a light-transmissive pattern through the light resistant material;
   a sensing system having a field of view and operative to detect light transmitted through at least one of the light-transmissive holes from an image reflected by a surface; and
   a controller coupled to the sensing system, the controller configured to determine a position of an object disposed within the field of view relative to the image.

17. The system of claim 16, wherein the light-resistant material at least partially defines an exterior surface of a device operative to perform at least one function.

18. The system of claim 17, wherein the controller is further configured to control an operation of the device based on the determined position.

19. The system of claim 16, further comprising a projection system operative to project an image through at least one of the light-transmissive holes onto a target surface located remotely from the pattern.

20. The system of claim 19, wherein the controller is further configured to modify the image projected by the projection system based on the interaction of an object with the projected image.

21. The system of claim 19, wherein the projection system and the sensing system are configured such that light projected by the projection system and light detected by the sensing system is transmitted through at least one common light-transmissive hole.

22. The system of claim 19, wherein the projection system and the sensing system are configured such that light projected by the projection system and light detected by the sensing system is transmitted through different light-transmissive holes.

* * * * *